(12) United States Patent
Baer et al.

(10) Patent No.: US 11,014,341 B2
(45) Date of Patent: May 25, 2021

(54) COMPOSITE SHAPE MEMORY MATERIALS

(71) Applicant: Case Western Reserve University, Cleveland, OH (US)

(72) Inventors: Eric Baer, Cleveland Heights, OH (US); Shannon Armstrong, Cleveland Heights, OH (US); Deepak Langhe, Cleveland, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 1956 days.

(21) Appl. No.: 14/395,367

(22) PCT Filed: Apr. 22, 2013

(86) PCT No.: PCT/US2013/037617
§ 371 (c)(1),
(2) Date: Oct. 17, 2014

(87) PCT Pub. No.: WO2013/159102
PCT Pub. Date: Oct. 24, 2013

(65) Prior Publication Data
US 2015/0093559 A1 Apr. 2, 2015

Related U.S. Application Data

(60) Provisional application No. 61/636,039, filed on Apr. 20, 2012.

(51) Int. Cl.
*B32B 27/08* (2006.01)
*B32B 7/02* (2019.01)
(Continued)

(52) U.S. Cl.
CPC ............ *B32B 27/08* (2013.01); *B29C 48/21* (2019.02); *B29C 61/0616* (2013.01); *B32B 7/02* (2013.01);
(Continued)

(58) Field of Classification Search
CPC ........... B32B 27/08; B32B 27/40; B32B 7/02; B32B 37/153; B32B 2375/00;
(Continued)

(56) References Cited

U.S. PATENT DOCUMENTS

| 7,105,117 B2 * | 9/2006 | Rodgers | ................... B29C 48/30 264/173.12 |
| 2004/0089412 A1 * | 5/2004 | Topolkaraev | ........... B32B 27/08 156/250 |

(Continued)

FOREIGN PATENT DOCUMENTS

| JP | 2821690 B2 | 11/1998 | | |
| WO | WO-0121688 A1 * | 3/2001 | .............. | C08J 3/241 |

(Continued)

OTHER PUBLICATIONS

[NPL-1] Ponting, M.; Hiltner, A.; Baer, E.; "Polymer Nanostructures by Forced Assembly: Process, Structure, and Properties". Macromol. Symp. 2010, 294-I, pp. 19-32. (Year: 2010).*

(Continued)

*Primary Examiner* — David Sample
*Assistant Examiner* — Donald M Flores, Jr.
(74) *Attorney, Agent, or Firm* — Tarolli, Sundheim, Covell & Tummino LLP

(57) ABSTRACT

A multilayered composite shape memory material includes a coextruded first polymer layer of a first polymer material and a second polymer layer of a second polymer material. The composite shape memory material after thermomechanical programming being capable of undergoing at least one temperature induced shape transition from a temporary shape to a permanent shape. The first polymer layer defines a hard segment of the shape memory material that provides the shape memory material with the permanent shape, and the second polymer layer defines a switching segment of the (Continued)

shape memory material that provides the shape memory material with the temporary shape.

16 Claims, 7 Drawing Sheets

(51) Int. Cl.
| | |
|---|---|
| *B29C 48/21* | (2019.01) |
| *B29C 61/06* | (2006.01) |
| *B32B 27/40* | (2006.01) |
| *B29C 48/00* | (2019.01) |
| *B29K 75/00* | (2006.01) |
| *B32B 37/15* | (2006.01) |
| *B29C 48/07* | (2019.01) |
| *B29C 48/18* | (2019.01) |
| *B29C 48/71* | (2019.01) |
| *B29C 48/375* | (2019.01) |
| *B29C 48/495* | (2019.01) |
| *B29K 67/00* | (2006.01) |
| *B29L 7/00* | (2006.01) |

(52) U.S. Cl.
CPC ............ *B32B 27/40* (2013.01); *B29C 48/022* (2019.02); *B29C 48/023* (2019.02); *B29C 48/07* (2019.02); *B29C 48/185* (2019.02); *B29C 48/387* (2019.02); *B29C 48/495* (2019.02); *B29C 48/71* (2019.02); *B29K 2067/04* (2013.01); *B29K 2075/00* (2013.01); *B29K 2995/0012* (2013.01); *B29L 2007/008* (2013.01); *B32B 37/153* (2013.01); *B32B 2250/42* (2013.01); *B32B 2307/734* (2013.01); *B32B 2307/738* (2013.01); *B32B 2367/00* (2013.01); *B32B 2375/00* (2013.01); *Y10T 428/24942* (2015.01); *Y10T 428/24975* (2015.01); *Y10T 428/24983* (2015.01)

(58) Field of Classification Search
CPC .......... B32B 2367/00; B32B 2307/738; B32B 2307/734; B32B 2250/42; B32B 37/24; B32B 37/00; B29C 61/0616; B29C 48/21; B29C 48/387; B29C 48/023; B29C 48/71; B29C 48/49; B29C 48/185; B29C 48/07; B29C 48/255; B29C 48/022; B29C 48/18; Y10T 428/24983; Y10T 428/24975; Y10T 428/24942; B29L 2007/008; B29K 2995/0012; B29K 2067/04; B29K 2075/00

See application file for complete search history.

(56) References Cited

U.S. PATENT DOCUMENTS

| | | | |
|---|---|---|---|
| 2005/0051540 | A1 | 3/2005 | Ekinge et al. |
| 2009/0072434 | A1 | 3/2009 | Takita et al. |
| 2009/0092807 | A1* | 4/2009 | Hu .................. B29C 61/003 428/215 |
| 2010/0028686 | A1* | 2/2010 | Xie .................. B29C 61/0616 428/413 |
| 2010/0196705 | A1 | 8/2010 | Hood et al. |

FOREIGN PATENT DOCUMENTS

| | | | | |
|---|---|---|---|---|
| WO | WO-02056930 A2 * | 7/2002 | ............ | B32B 1/08 |
| WO | 2005062735 A2 | 7/2005 | | |

OTHER PUBLICATIONS

[NPL-2] "Materials—Pellethane"; Microspec Corporation; Jun. 8, 2018, <https://www.microspecorporation.com/materials/polyurethanes/pellethane/>. (Year: 2018).*

[NPL-3] "Arkema Pebax® 2533 SD 02 Polyether Block Amide (PEBA)"; MatWeb—Material Property Data, <http://www.matweb.com/search/datasheet.aspx?matguid=746faeabfecf45da8d8d302e8bd75762>. (Year: 2020).*

[NPL-4] "Thermoplastic Polyurethane, Elastomer, Polyester Grade"; MatWeb—Material Property Data, <http://www.matweb.com/search/datasheet.aspx?matguid=9f5318a1f93b403bbd5748abec70fac1>. (Year: 2020).*

[NPL-5] "Polycaprolactone (PCL)", Polymer Properties Database, Apr. 19, 2017, <http://polymerdatabase.com/Polymer Brands/PCL.html>. (Year: 2017).*

* cited by examiner

Coextruded Multilayer Strands
PCL / PU, 512 Layers
Compositions: 30/70, 70/30
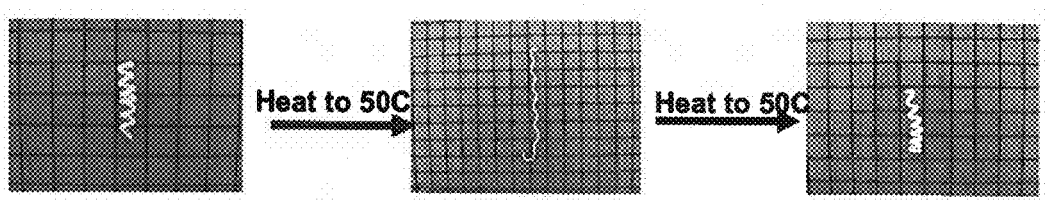
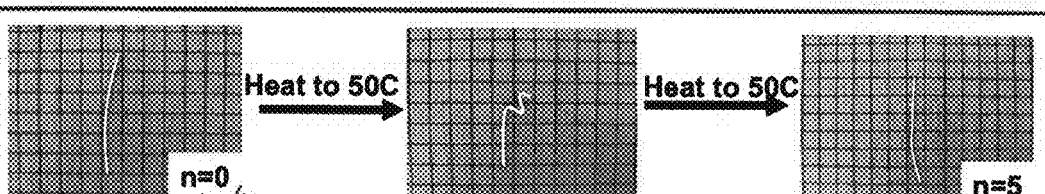
Fig. 5
Coextruded Multilayer Films
PCL / PU 512 Layers
Composition: 50/50
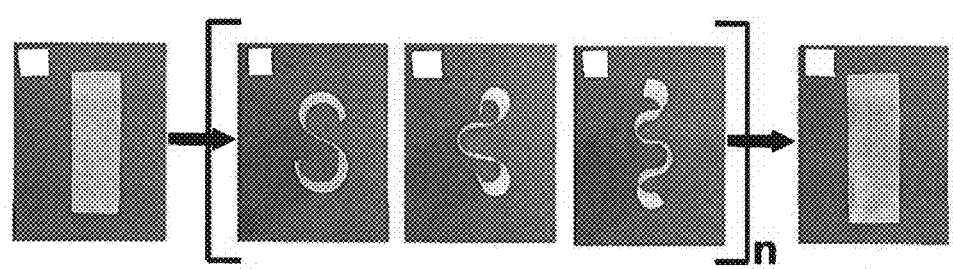
Fig. 6

Coextruded Multilayer Strands
PETG / EO, 512 Layers
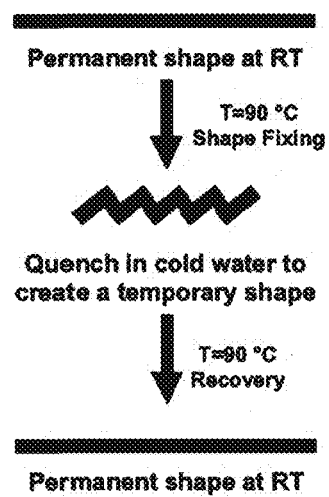
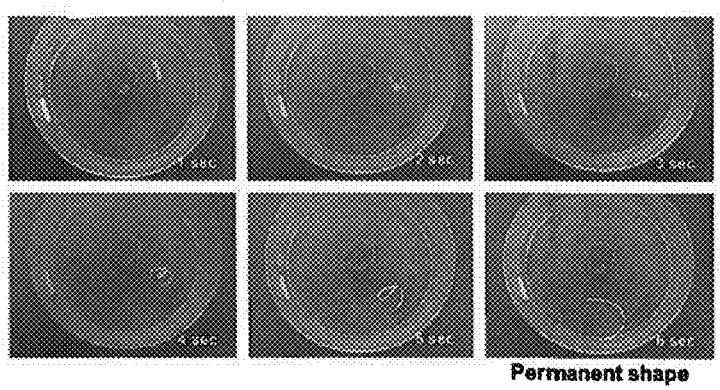
Fig. 9A                    Fig. 9B
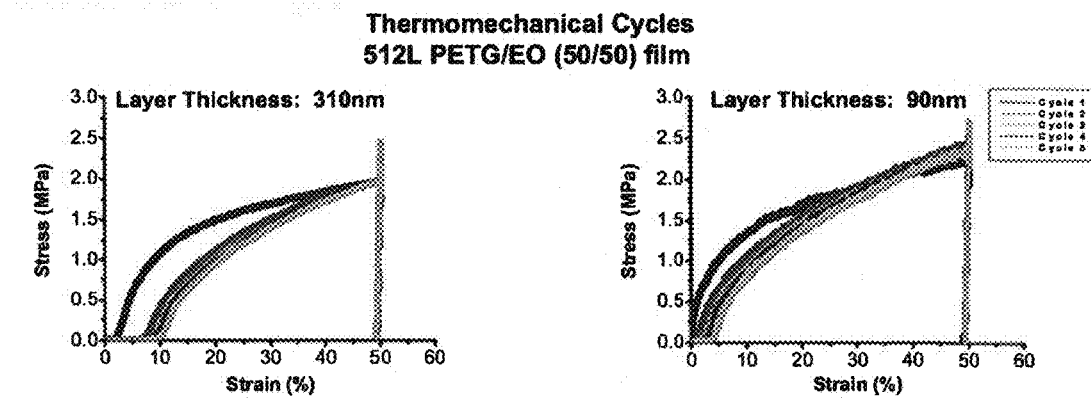
Fig. 10A                   Fig. 10B

Possible Multilayer System
PCL/PU/PE $T_{mPE} > T_{mPCL}$

COMPOSITE SHAPE MEMORY MATERIALS

RELATED APPLICATION

This application claims priority from U.S. Provisional Application No. 61/636,039, filed Apr. 20, 2012, the subject matter of which are incorporated herein by reference in their entirety.

GOVERNMENT FUNDING

This invention was made with government support under Grant No. RES501499 awarded by The National Science Foundation. The United States government may have certain rights to the invention.

BACKGROUND

Shape memory polymers (SMPs) are active materials that can exhibit at least two shape positions, one of which is a distinct permanent shape and the other, which is a temporary or fixed shape. The temporary or fixed shape forms or diminishes at most commonly a thermal transition, such as a glass transition or melting. Temporary shapes are achieved by exposing the SMP to an external stimulus, most often heat, causing a component of the SMP to exist above its transition temperature, either in a rubber or melted state. Deformation while in the rubber or melted state and subsequent cooling below the transition temperature, while under an applied stress, fixes the temporary shape through vitrification or crystallization of the rubber or melted SMP component. Subsequent exposure to an external stimulus causes the SMP to return to the original permanent shape.

Most SMPs exhibit dual shape memory behavior with two shape positions, permanent and temporary; however, some possess more than one temporary shape known as triple shape memory. This is particularly useful in medicine and aerospace applications where there is a high demand for the ability to work in confined spaces. Additionally, SMPs have the unique ability to be activated remotely to avoid damage to the surrounding environment during actuation and deployment. Heat, IR (infrared radiation) and UV light, electrical currents, magnetic fields, chemical, and moisture exposure can act as stimuli for triggering shape recovery.

Permanent and temporary networks are achieved through the polymer architecture and morphology. Most SMPs are copolymers that consist of hard segments, creating the permanent memory shape, and switching domains that produce the temporary shapes. To exhibit shape memory behavior, a copolymer often shows a phase separated architecture. A challenge exists in determining the copolymer compositions that will produce a structure capable of shape memory behavior.

In order to maintain the memory network, the transitions of each copolymer block must be sufficiently separated. In addition, a balance of the weight ratio of the memory and switching networks is necessary to produce a SMP with good shape fixing as well as good shape recovery. High hard segment compositions produce good recovery; however, negatively affect the shape fixing properties. Therefore, a compromise always exists between shape fixing and recovery.

Current shape memory polymers are generally copolymers that are specially synthesized for application as shape memory materials. This requires an in depth, time consuming, solvent heavy process to produce the SMP, after which additional solvents are often used to cast or coat SMP films. These processes involve the utilization of large amounts of often costly, flammable, and toxic organic solvents. Additionally, these solvents are expensive not only to purchase but also to dispose of at the end of SMP processing. In many cases, solvent costs, including initial solvent purchases, solvent handling equipment, and solvent disposal equipment and processes are significant costs in the manufacturing of polymers for shape memory applications.

The copolymers used are often polyurethane, polyether, and polyester based; however, the combinations of blocks for shape memory polymers are endless. At present, a vast majority of the SMPs are not produced on a large scale and/or not commercially available, resulting in an expensive production process.

SUMMARY

Embodiments described herein relate to a multilayered composite shape memory material that includes a coextruded first polymer layer of a first polymer material and a second polymer layer of a second polymer material. The first polymer material and the second polymer material can have different melt temperatures and/or glass transition temperatures. The composite shape memory material after thermomechanical programming can be capable of undergoing at least one temperature induced shape transition from a temporary shape to a permanent shape. The first polymer layer can define a hard segment of the shape memory material that provides the shape memory material with the permanent shape, and the second polymer layer can define a switching segment of the shape memory material that provides the shape memory material with the temporary shape.

Other embodiments described herein relate to a method of fabricating a multilayer shape memory material. The method includes co-extruding a first polymer material having a first glass transition or melt temperature and a second polymer material having a second glass transition temperature different than the first glass transition and/or melt temperature to form a multilayered shaped memory material. The multilayer shape memory material after thermomechanical programming is capable of undergoing at least one temperature induced shape transition from a temporary shape into a permanent shape.

Still other embodiments described herein relate to a multilayer shape memory material that includes a co-extruded, multilayered mechanically deformable composite shape memory sheet or film. The multilayered mechanically deformable composite shape memory sheet includes a plurality of at least two alternating layers (A) and (B) represented by formula $(AB)_x$, where $x=2^n$, and n is in the range of from 1 to 18. Layer (A) is comprised of polymer component (a), and layer (B) is comprised of polymer component (b). The polymer components (a) and (b) have different glass transition and/or melt temperatures, and the multilayer shape memory material after thermomechanical programming is capable of undergoing at least one temperature induced shape transition from a temporary shape into a permanent shape.

BRIEF DESCRIPTION OF THE DRAWINGS

FIG. 5 illustrates a photograph of a coextruded multilayer strand in accordance with an aspect of the application.

FIG. 6 illustrates a photograph of a coextruded multilayer film in accordance with an aspect of the application FIGS. 7(A-B) illustrate plots showing (A) stress versus strain and (B) recovery ratio of the film of FIG. 6.

FIGS. 9(A-B) illustrate (A) a schematic drawing and (B) a photograph of a coextruded multilayer film in accordance with another aspect of the application.

FIGS. 10(A-B) illustrate plots showing stress versus strain of films of FIG. 9 having various thicknesses.

DETAILED DESCRIPTION

Embodiments described herein relate to polymeric composite shape memory materials and to methods used to prepare polymeric shape memory materials via solventless processes. The polymeric composite shape memory materials prepared by the methods described herein can use commercially available polymers not traditionally considered to be shape memory polymers (SMPs). The polymeric composite shape memory materials (films, strands, or fibers) can be used for biomedical, aerospace, intelligent packaging, and sensor applications via melt processing without the use of any specialized synthesis or solvent.

Figure 1:
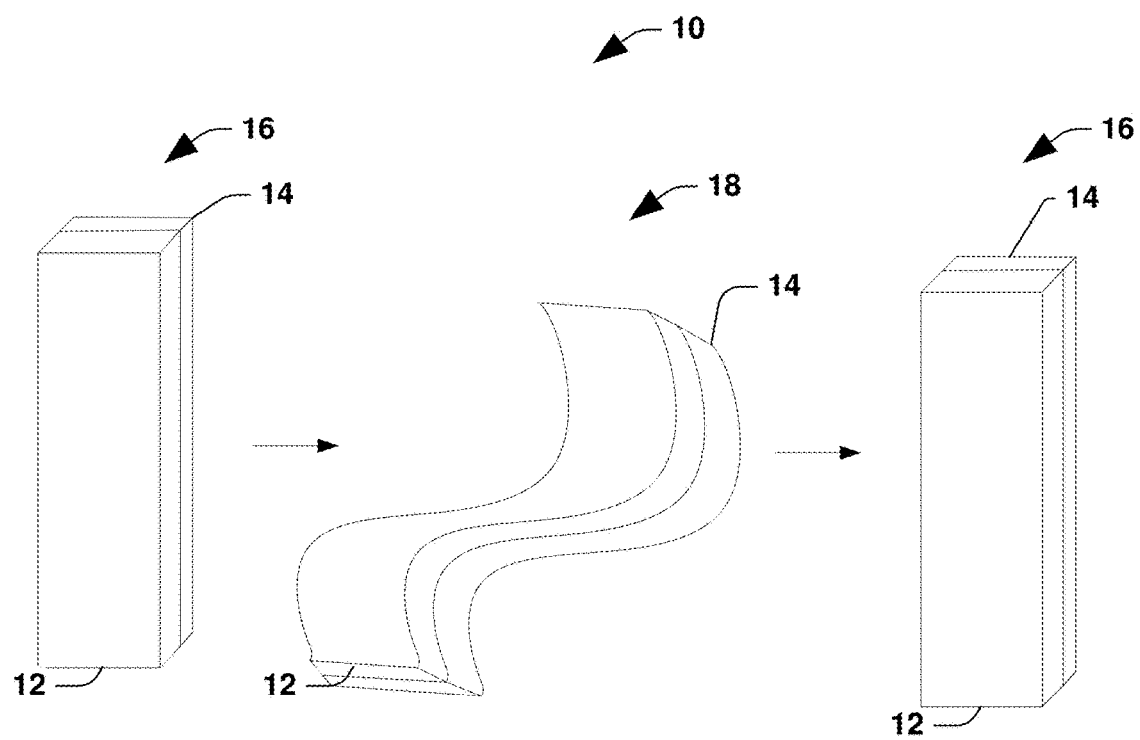
FIG. 1 illustrates a schematic view of a polymeric composite shape memory material in accordance with an aspect of the application.

FIG. 1 is a schematic illustration of a polymeric composite shape memory material 10 in accordance with an aspect of the application. The polymeric composite shape memory material 10 is capable of undergoing at least one temperature induced shape transition from a temporary shape 16 to a permanent shape 18. The polymeric composite shape memory material 10 includes at least a first polymer layer 12 and a second polymer layer 14. The first polymer layer 12 is formed from a first polymer that has a first glass transition temperature and first melt temperature. In some embodiments, the first polymer layer 12 can define a hard segment of the shape memory material 10 that provides the shape memory material 10 with the permanent memory shape 18. The second polymer layer 14 is formed from a second polymer material that has a second glass temperature and second melt temperature that is different than the melt temperature and/or glass transition temperature of the first polymer material. In some embodiments, the second polymer layer 14 can define the switching segment of the shape memory material 10 that produce the temporary shapes 18 of the shape memory material. The first polymer layer 12 and the second polymer layer 12 can define discrete nanoscale or microscale polymer domains (e.g., hard, crystalline, switching, and/or amorphous domains) that are on the same size scale as the phase separated domains (e.g., hard, crystalline, switching, and/or amorphous domains) in known shape memory polymers.

In some embodiments, the first glass transition temperature and/or first melt temperature of the first polymer material can be different from, respectively, the second glass transition temperature and/or second melt temperature of the second polymer material such that a polymeric composite is formed comprising the first polymer layer 12 and second layer 14, which exhibits shape memory behavior. For example, the polymeric composite shape memory material 10 when provide in the form of a film, strand, or other structure, can exhibit at least two shape positions, one of which is the distinct permanent shape 16 and the other, which is the temporary or fixed shape 18. The temporary or fixed shape 18 forms or diminishes at a thermal transition, such as a glass transition and/or melting transition that is defined by or determined by the glass transition temperatures and/or melt temperatures of the first polymer material and the second polymer material. Temporary shapes 18 are achieved by exposing the shape memory material 10 to an external stimulus, such as heat, causing either the first polymer or the second polymer to exist above its transition temperature, either in an amorphous, elastomeric, or melted state. Deformation while in the amorphous, elastomeric, or melted state and subsequent cooling below the transition temperature, while under an applied stress, fixes the temporary shape through vitrification or crystallization of the amorphous, elastomeric, or melted state of the first polymer material or second polymer material. Subsequent exposure to an external stimulus can causes the composite shape memory material to return to the original permanent shape. Both films and strands produced using the polymeric composite shape memory material can demonstrate good shape fixing, as well as 100% shape recovery upon a thermal stimulus.

In some embodiments, the first polymer layer 12 is elastic to provide mechanical recovery and the second polymer layer 14 is reversibly crosslinked, physically or chemically, to allow freezing of temporary shapes for use in various applications. Alternatively, the second polymer layer 14 can be elastic to provide mechanical recovery and the first polymer layer can be reversibly crosslinked, physically or chemically, to allow freezing of temporary shapes for use in various applications.

In other embodiments, the first polymer layer 12 can be a hard layer that is typically crystalline, with a defined melting point, and the second polymer layer 14 can be a soft switching layer that is typically amorphous, with a defined glass transition temperature. Alternatively, the second polymer layer 14 can be a hard layer that is typically crystalline, with a defined melting point, and the first polymer layer 12 can be a soft layer that is typically amorphous, with a defined glass transition temperature. In some embodiments, however, the hard layer(s), whether the first polymer layer 12 or the second polymer layer 14, can be amorphous and have a glass transition temperature rather than a melting point. In other embodiments, the soft layer(s), whether the first polymer layer or the second polymer layer, can be crystalline and have a melting point rather than a glass transition temperature. The melting point or glass transition temperature of the soft layer(s) can be substantially less than the melting point or glass transition temperature of the hard layer(s).

The first polymer material used to form the first polymer layer 12 and the second polymer material used to form the second polymer layer 14 can include any polymer that can be melt extruded and form a composite shape memory material. The first polymer material and the second polymer material should be selected such that their glass transition temperatures and/or melt temperatures differ and that upon melt extrusion form a composite of the first polymer layer and second polymer layer, which exhibits shape memory properties. The first polymer material can be immiscible or partially miscible with the second polymer material when coextruded so as to form discrete layers in the composite shape memory material 10. It will be appreciated that one or more additional layers formed from the first polymer material or the second polymer material or a different polymer materials may be provided to produce the polymeric shape memory material.

In some embodiments, the first polymer material and the second polymer material are not shape memory polymers, i.e., the first polymer material and the second polymer material when individually or separately formed into structures do not exhibit shape memory properties. It is the differing properties (e.g., glass transition temperature, melt temperature, and crystallinity) of the polymers, which are used to from the at least first polymer layer and second polymer layer, that provides the composite shape memory described herein with its shape memory behavior or properties. This allows selection of a broader range of polymers to form the composite shape memory material than has been used to form shape memory materials with shape memory polymers. It will be appreciated though that at least the first polymer material or second polymer material could potentially be a shape memory polymer.

Examples of polymeric materials that can potentially be used for the first and second polymer materials include, but are not limited to, melt extrudable polyesters, such as poly(ethylene terephthalate) (PET), poly(butylene terephthalate), poly(ethylene terephthalate glycol), polycaprolactone (PCL), and poly(ethylene naphthalate)polyethylene; naphthalate and isomers thereof such as 2,6-, 1,4-, 1,5-, 2,7-, and 2,3-polyethylene naphthalate; polyalkylene terephthalates, such as polyethylene terephthalate, polybutylene terephthalate, and poly-1,4-cyclohexanedimethylene terephthalate; polyimides, such as polyacrylic imides; polyetherimides; polyurethanes, styrenic polymers, such as atactic, isotactic and syndiotactic polystyrene, a-methyl-polystyrene, para-methyl-polystyrene; polycarbonates such as bisphenol-A-polycarbonate (PC); poly(meth)acrylates, such as poly(isobutyl methacrylate), poly(propyl methacrylate), poly(ethyl methacrylate), poly(methyl methacrylate), poly(butyl acrylate) and poly(methyl acrylate) (the term "(meth)acrylate" is used herein to denote acrylate or methacrylate); cellulose derivatives, such as ethyl cellulose, cellulose acetate, cellulose propionate, cellulose acetate butyrate, and cellulose nitrate; polyalkylene polymers such as polyethylene, polyethylenes, such as polyethylene and polyethylene oxide (PEO); polypropylene, polybutylene, polyisobutylene, and poly(4-methyl)pentene; fluorinated polymers such as perfluoroalkoxy resins, polytetrafluoroethylene, fluorinated ethylene-propylene copolymers, polyvinylidene fluoride, and polychlorotrifluoroethylene and copolymers thereof; chlorinated polymers, such as polydichlorostyrene, polyvinylidene chloride and polyvinylchloride; polysulfones; polyethersulfones; polyacrylonitrile; polyamides such as nylon, nylon 6,6, polycaprolactam, and polyamide 6 (PA6); polyvinylacetate; and polyether-amides. Additional polymeric materials include an acrylic rubber; isoprene; isobutylene-isoprene (IIR); butadiene rubber (BR); butadiene-styrene-vinyl pyridine (PSBR); butyl rubber; polyethylene; chloroprene (CR); epichlorohydrin rubber; ethylene-propylene (EPM); ethylene-propylene-diene (EPDM); nitrile-butadiene (NBR); polyisoprene; silicon rubber; styrene-butadiene (SBR); and urethane rubber. Still additional polymeric materials include block or graft copolymers. In one instance, the polymeric materials used to form the layers may constitute substantially immiscible thermoplastics.

In addition, each individual layer 12, 14 may include blends of two or more of the above-described polymers or copolymers. Preferably, the components of the blend are substantially miscible with one another yet still maintaining substantial immiscibility between the layers 12, 14. The polymer materials comprising the layers 12, 14 can also include organic or inorganic materials, including nanoparticulate materials, designed, for example, to modify the mechanical properties of the polymer layers. It will be appreciated that potentially any extrudable polymer can be used as the first polymer material (a) and the second polymer material (b) so long as upon coextrusion such polymer materials (a), (b) are substantially immiscible and form discrete layers or polymer regions.

In one example, the composite shape memory material can include a first polymer layer that includes a polycaprolactone polyester and a second polymer layer that includes a polyurethane. The polycaprolactone polyester and the polyurethane can be coextruded to form at least first and second polymer layers of the composite shape memory material. In another example, the composite shape memory material can include a first polymer layer that includes a polyethylene and a second polymer layer that includes a poly(ethylene terephthalate gycol). In still another example, where the composite shape memory material has a triple shape memory, the composite can include a first polymer layer includes a polycaprolactone, a second polymer layer that includes a polyurethane, and a third polymer layer that includes a polyethylene. The polycaprolactone polyester, the polyurethane, and the polyethylene can be coextruded to form first, second, and third polymer layers of the composite shape memory material.

The shape memory material may also include fillers (e.g., inorganic fillers) or other active materials (such as, e.g., shape memory alloy wires, magneto-responsive fillers, electroactive fillers, photo-responsive organic dyes, and/or the like). It is to be understood that fillers may be reinforcing fillers (which improve the mechanical properties of the shape memory material), active fillers such as, e.g., magnetic or electrically conductive particles (which may contribute to the triggering mechanism for the shape memory effect), or active fillers that may contribute to improvement of other physical properties of the shape memory material such as, e.g., its thermal conductivity. Also, the shape memory material may include other additives, such as UV blockers, colorant dyes, or other additives suitable for a particular application.

The polymeric composite shape memory material described herein can be prepared by multilayer coextrusion melt processing on a large scale for commercial applications without the use of volatile, toxic, environmentally-unfriendly, and typically flammable liquid solvents. The multilayer coextrusion can be a continuous process that is done completely without the aid of solvents. Additionally, less chemical synthesis is necessary when using commercially available homopolymers, copolymers, and multi block systems instead of specially synthesized copolymers. The layered structure mimics the phase separated architecture of shape memory copolymers. The degree of shape recovery can be controlled by the polymers chosen and the architecture of the permanent material structure.

Coextrusion is generally used to produce materials that have thick layers (several micrometers). The use of the multilayer coextrusion process allows for the production of films, strands, or fibers with thin layers through the use of layer multiplication, offset compositions, gradient architectures, and surface layers. In addition, the production of a shape memory material containing layers of different thicknesses (20 nm-10's of μm) allows for the potential of varying memory, deformation, and recovery behaviors.

Figure 2:
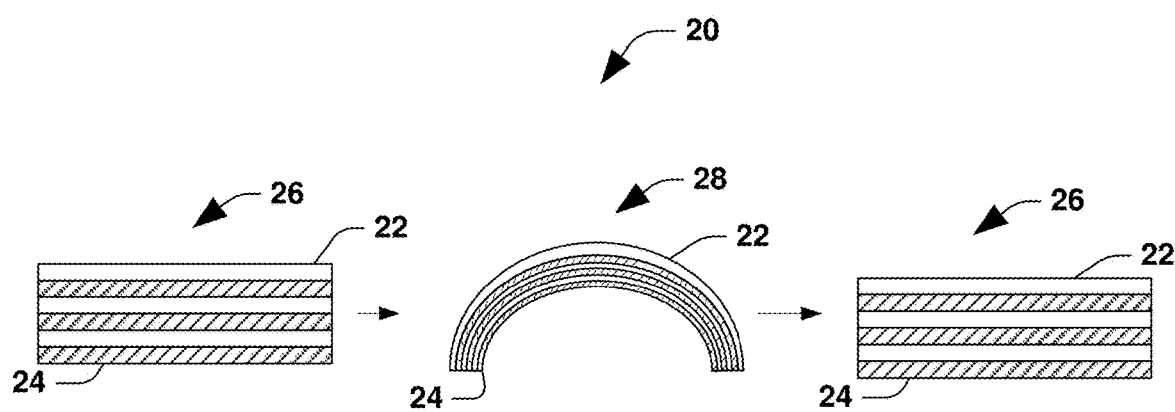
FIG. 2 illustrates a schematic view of a multilayer composite shape memory material in accordance with another aspect of the application.

In some embodiments, as illustrated in FIG. 2, the polymeric composite shape memory material can be a multilayer material 20 that exhibits shape memory behavior between a permanent shape 26 and a fixed or temporary shape 28. The multilayer material can be made from two alternating first polymer layers (A) 22 and second polymer layers (B) 24 (e.g., ABABA . . . ) that are formed, respectively, from first polymer component (a) and second polymer component (b). In some examples, the multilayer shape memory material can include at least 10 alternating layers (A) and (B), preferably from about 20 to about 500,000 alternating layers, including any increments within these ranges.

Each of the layers (A) 22 and (B) 24 may be microlayers or nanolayers. The first polymer component (a) and second polymer component (b) can exhibit different glass transition and/or melt temperatures and form a multilayer polymer composite sheet or film represented by formula $(AB)_x$, where $x=(2)^n$, and n is the number of multiplier elements and is in the range of from 1 to 18. In other embodiments, the alternating first polymer layer (A) 22 and second polymer layer B 24 can be provided in the polymeric multilayer shape memory material represented by formula $(ABA)_x$ or $(BAB)_x$, where $x=(2)^n+1$, and n is the number of multiplier elements and is in the range of 0 to 18. Further, polymer components (a) and (b) may be the same materials chemically, as long as they can form distinct layers exhibiting different thermal glass transition and/or melt temperatures by virtue of secondary physical differences, such as conformational differences between polymeric structures, differences resulting from different processing conditions, such as orientation or MW differences.

In some embodiments, the first polymer (a) and the second polymer (b) can be independently a glassy polymeric material, a crystalline polymeric material, an elastomeric polymeric material or blends thereof as long as the polymeric composite multilayer shape memory material so formed exhibits shape memory behavior or properties. By way of example, when the first polymer component (a) is a glassy material, second polymer component (b) can be an elastomeric material, a glassy material, a crystalline material or a blend thereof. Alternatively, when first polymer component (a) is an elastomeric material, second polymer component (b) can be an elastomeric material, a glassy material, a crystalline material or a blend thereof.

In some embodiments, the first polymer layer(s) is a confined crystallization layer that is sandwiched between second polymer layers. The confined crystallization layer(s) can be formed by forced coextrusion of a first crystallizable polymer material and a second polymer material. The coextruded first crystallizable polymer material can form a plurality of first crystallization polymer layers that are confined or sandwiched between second polymer layers.

The thickness of the individual first confined crystallization layers can be such that each first layer forms a substantially crystalline lamellae. By substantially crystalline lamellae, it is meant that each first polymer layer is at least about 60% crystalline, at least about 70% crystalline, at least about 80% crystalline, at least about 90% crystalline, at least about 95% crystalline, or at least about 99% crystalline. This thickness can be on a nano-scale level and be, for example, from about 5 nanometers to about 1000 nanometers, from about 10 nanometers to about 500 nanometers, or from about 10 nanometers to about 20 nanometers. The thickness of each first layer will depend on the individual polymer material used form the first layers and can be readily selected to optimize crystallization properties (i.e., formation of high aspect ratio lamellae). In an aspect of the invention, the thicknesses of the first polymer layers should be such that a high aspect ratio crystalline lamellae is formed for each first polymer layer but not so thin that the first polymer layers readily break-up or fracture upon coextrusion or after confinement.

The thickness of the individual second layers used to confine the first layers can be on a nano-scale level. The thicknesses of these layers can be, for example, from about 5 nanometers to about 1000 nanometers, from about 10 nanometers to about 500 nanometers, or from about 10 nanometers to about 100 nanometers.

The polymeric multilayer shape memory material may alternatively include more than two different polymer components, for example, where it is desired to form a shape memory material with a triple shape memory. For example, a three component structure of alternating layers (A), (B), and (C) (e.g., ABCABCABC . . . ) of, respectively, components (a), (b), and (c) is represented by $(ABC)_x$, where x is as defined above. A structure that includes any number of different component layers in any desired configuration and combination is included within the scope of the present invention, such as (CACBCACBC . . . ).

It should be understood that the multilayer structure may include additional types of layers. For example, these other layers can include tie layers, adhesive layers, and/or other polymer layers. The components of the various alternating layers may be the same or different. For instance, a three component structure of alternating layers (ABCABCA. . . ) of components (a), (b) and (c) is represented by $(ABC)_x$, where x is as defined above.

Figure 3:
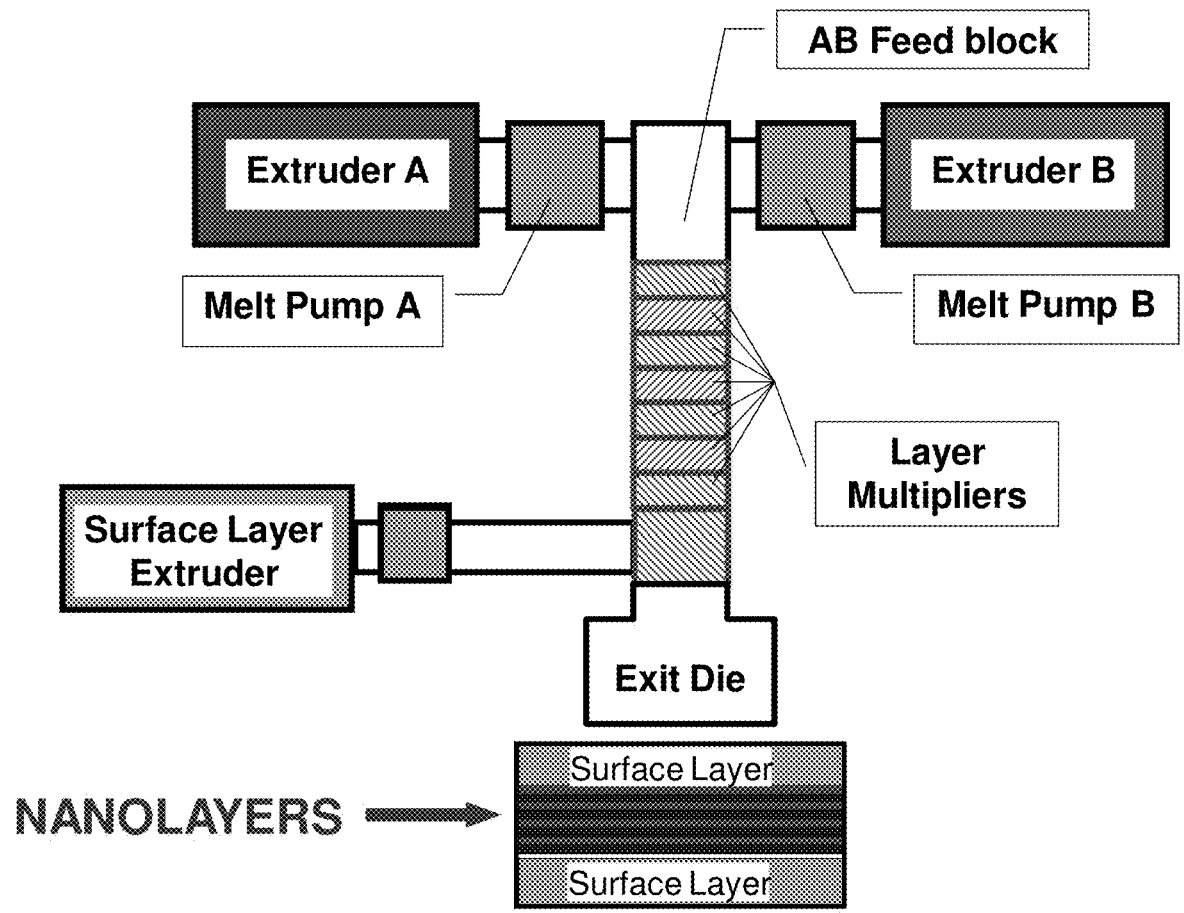
FIG. 3 illustrates a schematic drawing of a layer-multiplying coextrusion process for forced-assembly of polymer layers in accordance with an aspect of the application.
Figure 4:
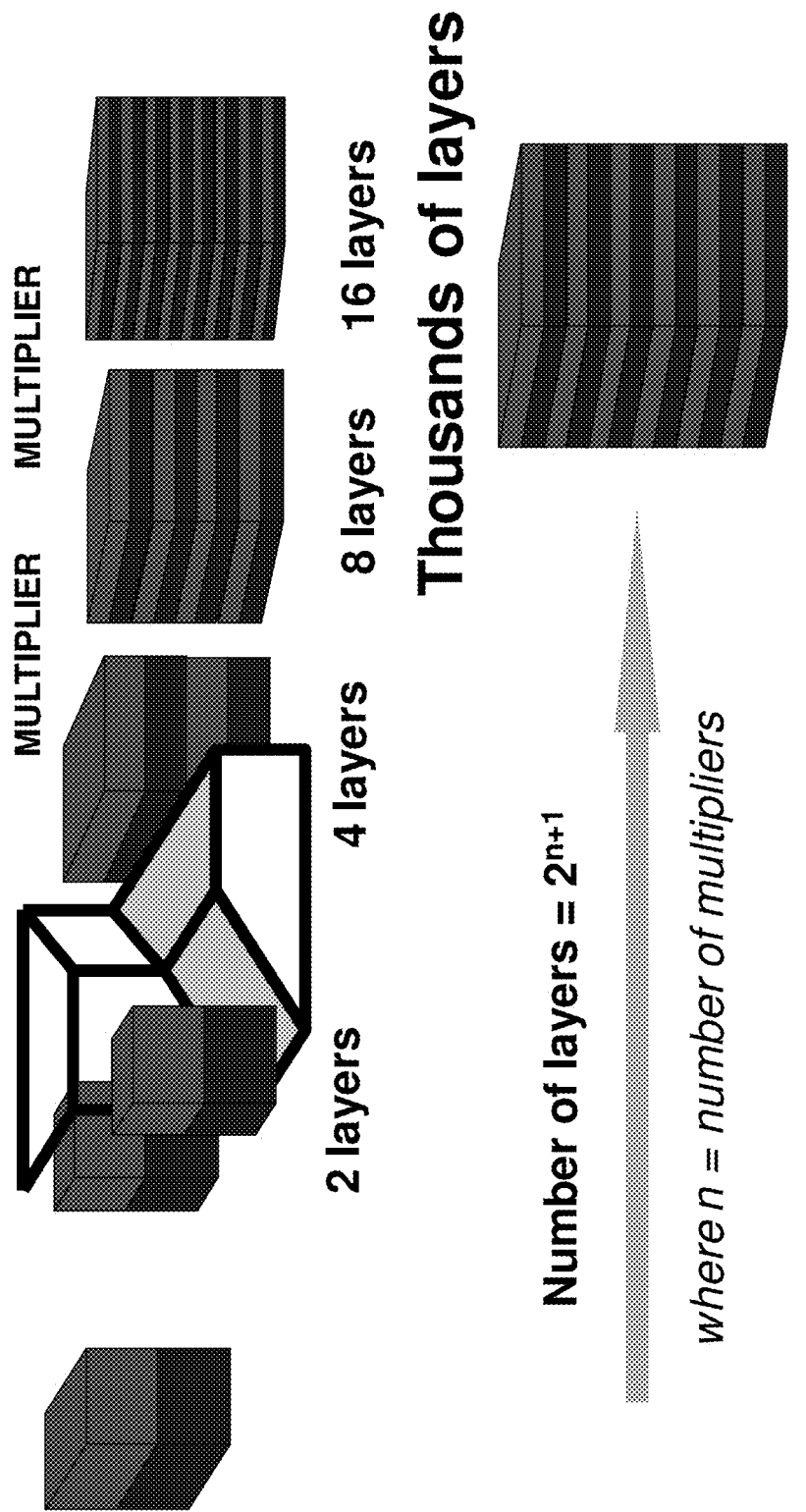
FIG. 4 illustrates a schematic drawing of a layer-multiplying coextrusion for forced-assembly of polymer layers in accordance with another aspect.

The multilayer shape memory material can be prepared by coextrusion of the two polymer materials. Traditionally shape memory materials are often made by solvent based processes. These techniques are high cost, highly toxic, and not environmentally friendly. The proposed new process can potentially eliminate all solvents, becoming a safe, non-toxic process. The coextrusion of shape memory materials is a rapid, continuous process that is capable of producing large quantities of materials with various architectures in a short amount of time. Melt extrusion can also provide a method of producing polymeric shape memory materials from commercially available polymers, eliminating the need for specific synthesis processes A typical multilayer coextrusion apparatus is illustrated in FIGS. 3 and 4. The two component (AB) coextrusion system consists of two ¾ inch single screw extruders each connected by a melt pump to a coextrusion feedblock. The feedblock for this two component system combines polymeric material (a) and polymeric material (b) in an (AB) layer configuration. The melt pumps control the two melt streams that are combined in the feedblock as two parallel layers. By adjusting the melt pump speed, the relative layer thickness, that is, the ratio of A to B can be varied. From the feedblock, the melt goes through a series of multiplying elements. A multiplying element first slices the AB structure vertically, and subsequently spreads the melt horizontally. The flowing streams recombine, doubling the number of layers. An assembly of n multiplier elements produces an extrudate with the layer sequence $(AB)_x$ where x is equal to $(2)^n$ and n is the number of multiplying elements. It is understood by those skilled in the art that the number of extruders used to fabricate the structure of the invention equals the number of components. Thus, a three-component multilayer (ABC . . . ), requires three extruders.

The multilayer shape memory material prepared by the coextrusion process can have at least 2 layers, for example, at least about 10 layers, 50 layers, 100 layers, or 1000 layers, including any number of layers within that range. In one example, the multilayer shape memory material has from 50 to 10000 layers. In another example, the multilayer shape memory material is in the form of film or sheet. By altering the relative flow rates or the number of layers, while keeping the film or sheet thickness constant, the individual layer thickness can be controlled. The multilayer film or sheet can have an overall thickness ranging from 10 nm to 1000 μm, preferably from about 100 nm to about 200 μm and any increments therein. Further, the multilayer films may be formed into a number of articles by, for example, thermoforming, vacuum forming, or pressure forming.

The polymeric multilayer shape memory material can be used to prepare articles of manufacture for use in biomedical applications. For example, sutures, orthodontic materials, bone screws, nails, plates, meshes, prosthetics, pumps, catheters, tubes, films, stents, orthopedic braces, splints, tape for preparing casts, and scaffolds for tissue engineering, implants, and thermal indicators can be prepared.

The polymeric multilayer shape memory material can be formed into the shape of an implant which can be implanted within the body to serve a mechanical function. Examples of such implants include rods, pins, screws, plates and anatomical shapes. A particularly preferred use of the compositions is to prepare sutures that have a rigid enough composition to provide for ease of insertion, but upon attaining body temperature, soften and form a second shape that is more comfortable for the patient while still allowing healing.

There are numerous applications for the polymeric multilayer shape memory material other than biomedical applications. These applications include members requiring deformation restoration after impact absorption, such as bumpers and other auto body parts, packaging for foodstuffs, automatic chokes for internal combustion engines, polymer composites, textiles, pipe joints, heat shrinkable tubes, clamping pins, temperature sensors, damping materials, sports protective equipment, toys, bonding materials for singular pipes, internal laminating materials of pipes, lining materials, and clamping pins.

In some embodiments, the shaped articles are fasteners, including grommets and rivets. A rivet may comprise a longitudinally-deformed shaped cylinder that may be inserted into an object or work piece having an aperture there through. Upon heating, the deformed cylinder will contract longitudinally and expand laterally. The radii of the permanent and deformed shapes of the fastener are chosen such that the fastener may be inserted into the work piece, but will expand to fill and grip the work piece. Further, the degree of longitudinal deformation (stretching) of the fastener may be chosen such that the fastener will impart compression to the work piece on heat recovery to the permanent shape.

EXAMPLE

In the present example, polyurethane (PU) was coextruded with polycaprolactone (PCL) to produce a shape memory material with a melt temperature based switching. Stands or films of the coextruded PU/PCL included 64 or 512 layers. For the 64 layer strands or films, the layer thickness was from 2.2 μm to 5.2 μm. For the 512 layer strands or films, the layer thickness was from 0.05 μm to 0.4 μm. The composition (vol/vol) was varied as PU/PCL 30/70, 50/50, and 70/30.

Poly(ethylene octane) (EO) was coextruded with poly (ethylene terephthalate glycol) (PETG) to produce a shape memory material with a glass transition temperature based switching. Stands or films of the coextruded PETG/EO included 64 or 512 layers. For the 64 layer strands or films, the layer thickness was from 2.2 μm to 5.2 μm. For the 512 layer strands or films, the layer thickness was from 0.05 μm to 0.4 μm. The composition (vol/vol) was varied as PETG/EO 30/70, 50/50, and 70/30.

The properties of the PU/PCL shape memory materials and the PETG/EO shape memory materials are shown in Table 1.

TABLE 1

| | $T_m$ Based Switching | | $T_m$ Based Switching | |
|---|---|---|---|---|
| | Memory | switch | Memory | switch |
| Layered System | Polyurethane | Polycaprolactone | Poly (ethylene octane) | Poly(ethylene terephthalate glycol) |
| $T_{ag}$ (0° C.) | <0 | <0 | <0 | 80 |
| $T_m$ (0° C.) | — | 60 | 100 | — |
| Switching Window | 50-100+° C. | | 80-100° C. | |
| Number of Layers | 64, 512 | | 64, 512 | |
| Compositions | 30/70, 50/50, 70/30 | | 30/70, 50/50, 70/30 | |
| Layer Thickness (Standard, Films) | 2.2-5.2 μm, 0.05-0.4 μm | | 2.2-5.2 μm, 0.05-0.4 μm | |

A strand of the polycaprolactone (PCL)/polyurethane (PU) multilayered shape memory material comprising 512 alternating layers with a composition of PCL/PU of 30/70 and 70/30 is illustrated in FIG. 5. FIG. 5 shows that the PCL/PU multilayer strand can be fixed into temporary shapes and recover back to the original strand shape, showing little or no permanent deformation of the sample.

A film of the polycaprolactone (PCL)/polyurethane (PU) multilayered shape memory material comprising 512 alternating layers with a composition of PCL/PU of 50/50 is illustrated in FIG. 6. FIG. 6 shows that the PCL/PU multilayer film can be fixed into temporary shapes and recover back to the original film shape.

Figure 7A:
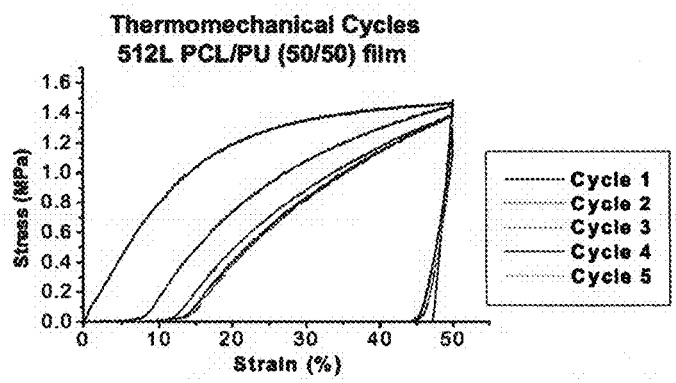
Figure 7B:
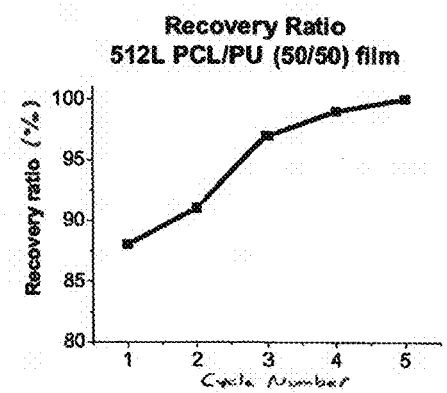

The multilayer film of FIG. 6 was subjected to thermomechanical cycling and the stress, strain, and recovery ratio was measured. The results are shown in Table 2 and FIGS. 7(A-B). FIGS. 7(A-B) show that the thermomechanical cycling improves shape recovery of the microlayered films with little effect on the shape fixity ratio.

TABLE 2

| Shape recovery ratio and Shape fixity ratio of each cycle | | | | | |
|---|---|---|---|---|---|
| Cycling times | 1 | 2 | 3 | 4 | 5 |
| Shape recovery ratio | 88% | 91% | 97% | 99% | 100% |
| Shape fixity ratio | 95% | 90% | 90% | 90% | 90% |

Figure 8A:
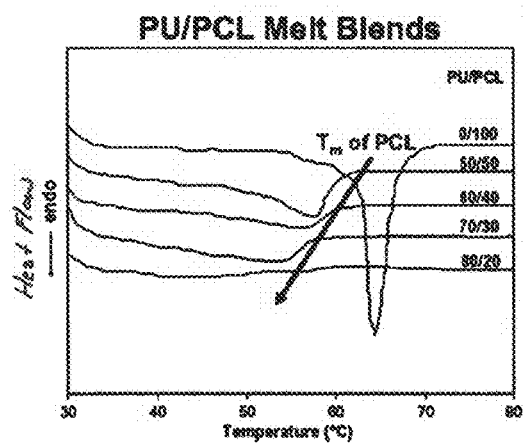
FIGS. 8(A-B) illustrate plots showing the switching temperature of (A) films prepared from various melt blends of PCL/PU in which the ratio of PCL/PU was varied, and (B) multilayer films comprising 512 alternating PU/PCL layers in which the ratio of PCL/PU in the film was varied from 30/70, 50/50, and 70/30.
Figure 8B:
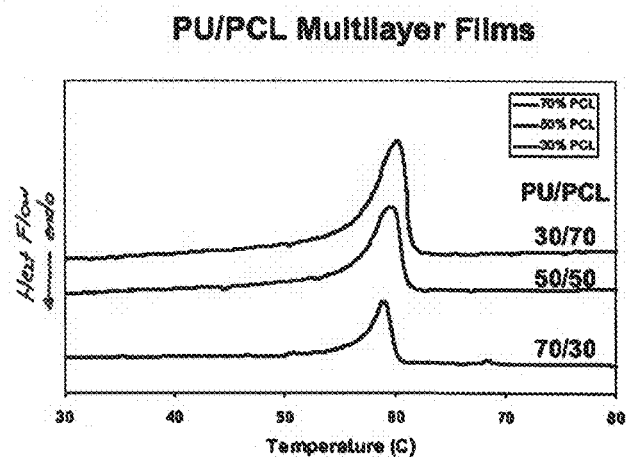

Films prepared from various melt blends of PCL/PU in which the ratio of PCL/PU was varied was compared to multilayer films comprising 512 alternating PCL/PU layers in which the ratio of PCL/PU in the film was varied from 30/70, 50/50, and 70/30. The effect of the composition on the switching temperature was plotted and compared. FIGS. 8(A-B) show that unlike copolymer and melt blends, the composition of multilayer PCL/PU films has little effect on the switching temperature (the $T_m$ of PCL).

A strand of the PETG/EO multilayered shape memory material comprising 512 alternating layers with a composition of PETG/EO of 30/70 and 70/30 is illustrated in FIGS. 9(A-B). FIGS. 9(A-B) show that the PETG/EO multilayer strand can be fixed into temporary shapes and recover back to the original strand shape, showing little or no permanent deformation of the sample.

Films of the PETG/EO multilayered shape memory material comprising 512 alternating layers with a composition of PETG/EO of 50/50 and layer thicknesses of respectively 310 nm and 90 nm for the films was subjected to thermomechanical cycling and the stress, strain, and recovery ration was measured. The results are shown in Table 3 (associated with Fig.10A) and Table 4 (associated with Fig.10B). FIGS. 10(A-B) show that shape fixity and recovery is good, particularly for thinner layers, and slightly improves upon cycling.

TABLE 3

Shape recovery ratio and Shape fixity ratio of each cycle

| Cycling times | 1 | 2 | 3 | 4 | 5 |
|---|---|---|---|---|---|
| Shape recovery ratio | 90% | 95% | 98% | 100% | 100% |
| Shape fixity ratio | 99% | 99% | 99% | 99% | 99% |

TABLE 4

| Cycling times | 1 | 2 | 3 | 4 | 5 |
|---|---|---|---|---|---|
| Shape recovery ratio | 98% | 98% | 100% | 100% | 100% |
| Shape fixity ratio | 99% | 99% | 99% | 99% | 99% |

Figure 11A:
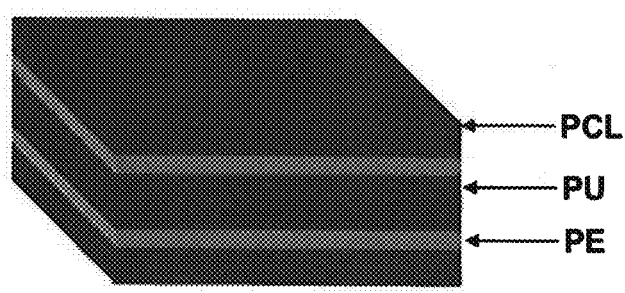
FIGS. 11 (A-C) illustrate (A) a schematic drawing of a triple shape memory material, (B) photographs of distinct shapes of the material, and (C) the temperature switching transitions when the material reaches the shapes in accordance with an aspect of the application.
Figure 11B:
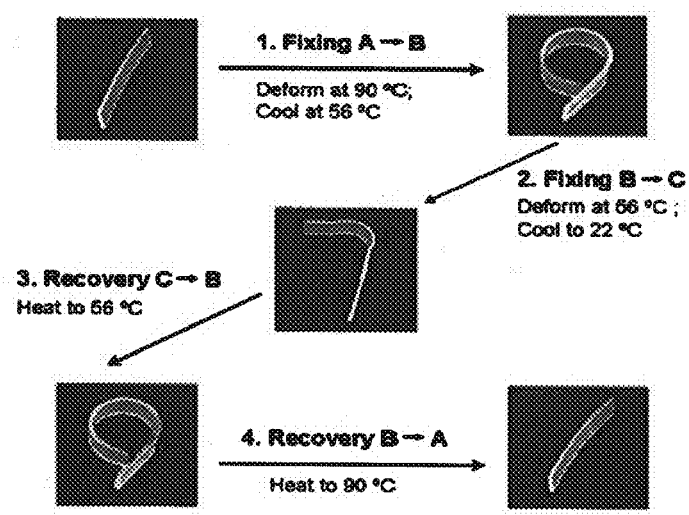
Figure 11C:
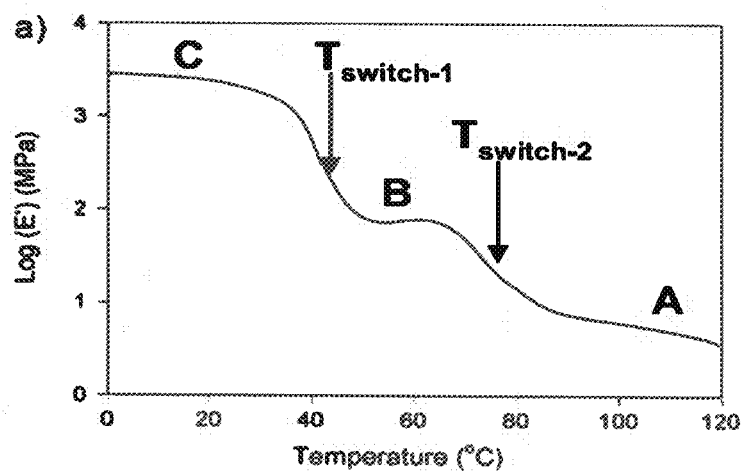

FIG. 11A illustrates an example of a triple shape memory film of polycaprolactone (PCL)/polyurethane (PU)/polyethylene (PE) multilayered shape memory material. The triple shape memory material exhibits two temporary shapes (FIG. 11B) through two distinct transitions (FIG. 11C) at which each shape is formed.

While a preferred embodiment of the invention has been illustrated and described, it shall be understood that the invention is not limited to this embodiment. Numerous modifications, changes and variations will be obvious for those skilled in the art, without departing from the scope of the invention as described by the appended claims. All patents, publications, and references cited herein are incorporated by reference in their entirety.

Having described the invention, we claim:

1. A multilayered composite shape memory material comprising:
    a coextruded first polymer layer of a first polymer material and second polymer layer of a second polymer material being immiscible or partially miscible with the first polymer material such that the first and second polymer layers are distinct from one another, the first polymer material and the second polymer material having different melt temperatures and/or glass transition temperatures, the composite shape memory material after thermomechanical programming being capable of undergoing at least one temperature induced shape transition from a temporary shape to a permanent shape, the first polymer layer defining a hard segment of the shape memory material that provides the shape memory material with the permanent shape, and the second polymer layer defining a switching segment of the shape memory material that provides the shape memory material with the temporary shape, the first polymer layer extending parallel to the second polymer layer prior to and in response to the at least one temperature induced shape transition.

2. The material of claim 1, comprising a plurality of alternating first polymer layers and second polymer layers.

3. The material of claim 2, comprising at least 10 alternating first polymer layers and second polymer layers.

4. The material of claim 1, the first polymer layer causing elastic recovery of the shape memory material from the temporary shape to the permanent shape upon heating of the shape memory material above a switching temperature of the second polymer layer.

5. The material of claim 1, wherein the first polymer layer and the second polymer layer having average thicknesses of about 10 nm to about 50 μm.

6. The material of claim 1, wherein the first polymer material and the second polymer material are not shape memory polymers.

7. The material of claim 1, the first polymer material comprising polyurethane and the second polymer material comprising polycaprolactone.

8. The material of claim 1, further comprising a third polymer layer of a third polymer material, the third polymer layer defining a second switching segment of the shape memory material that provides the shape memory material with a second temporary shape.

9. The material of claim 1, wherein all the first and second polymer layers have shape recovery ratios greater than about 75%.

10. A multilayer shape memory material comprising:
    a co-extruded, multilayered mechanically deformable composite shape memory sheet;
    wherein the multilayered mechanically deformable composite shape memory sheet includes a plurality of at least two alternating layers (A) and (B) represented by formula $(AB)_x$, where $x=2^n$, and n is in the range of from 1 to 18;
    wherein layer (A) is comprised of polymer component (a) and layer (B) is comprised of polymer component (b), wherein the polymer component (a) is immiscible or partially miscible with the polymer component (b) such that the alternating layers (A) and (B) are distinct from one another; and
    wherein the polymer components (a) and (b) have different glass transition and/or melt temperatures and the multilayer shape memory material after thermomechanical programming being capable of undergoing at least one temperature induced shape transition from a temporary shape into a permanent shape wherein at least one of the polymer component (a) or the polymer component (b) are not shape memory polymers, wherein the layer (A) extends parallel to the layer (B) prior to and in response to the at least one temperature induced shape transition.

11. The material of claim 10, wherein the polymer layer (A) causes elastic recovery of the shape memory material from the temporary shape to the permanent shape upon heating of the shape memory material above a switching temperature of the polymer layers (B).

12. The material of claim 10, wherein the polymer layers (A) and (B) have an average thicknesses of about 10 nm to about 50 μm.

13. The material of claim 10, wherein the polymer component (a) and the polymer component (b) are not shape memory polymers.

14. The material of claim 10, wherein the polymer component (a) is a polyurethane and the polymer component (b) is a polycaprolactone.

15. The material of claim 10, further comprising a polymer layer (C) comprising polymer component (c), wherein the polymer layer (C) defines a second switching segment of the shape memory material that provides the shape memory material with a second temporary shape.

16. The material of claim 10, wherein all the alternating layers have shape recovery ratios greater than about 75%.

\* \* \* \* \*